March 12, 1963     E. HOLMAN     3,080,632
ZIPPER SAFETY FASTENER
Filed July 20, 1961
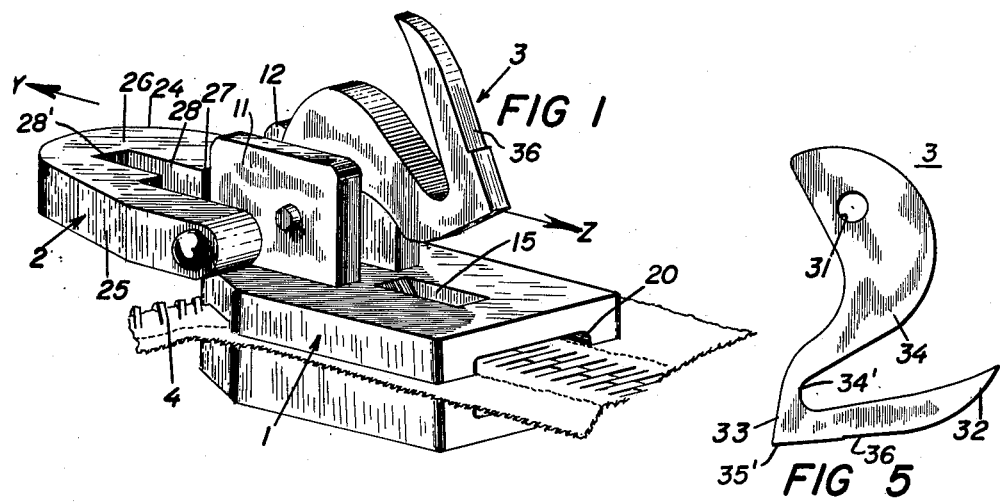
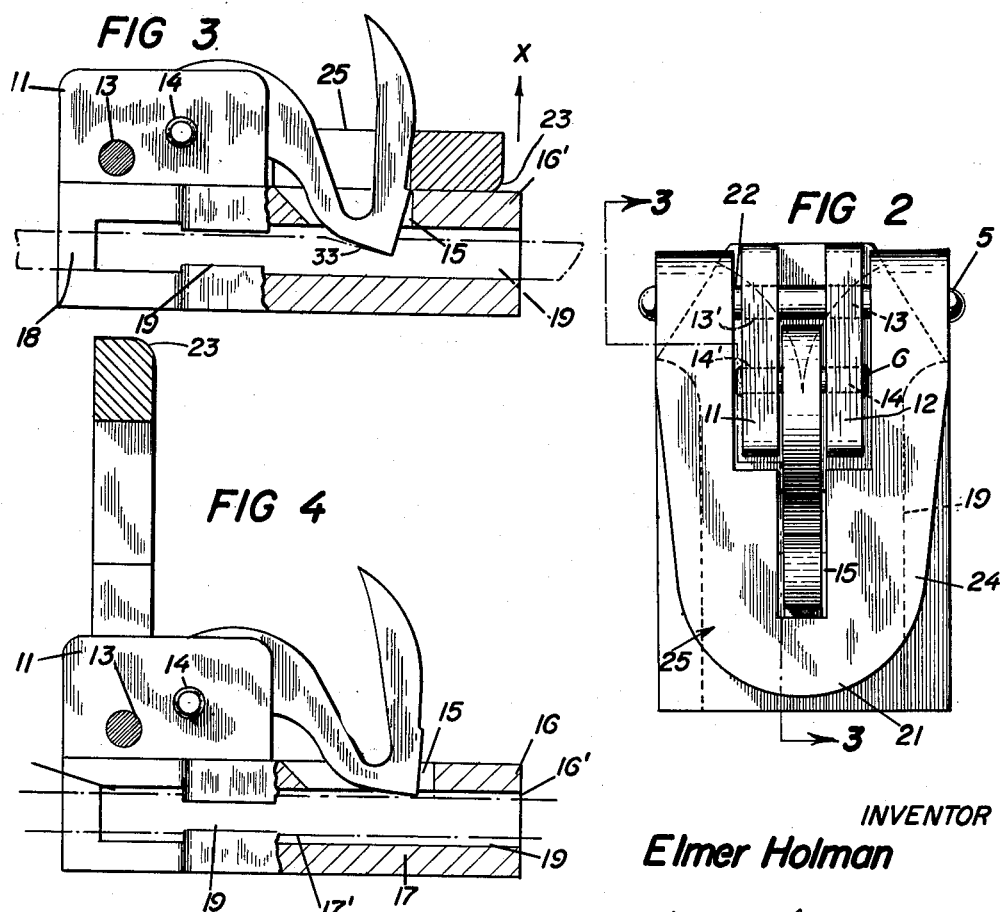
INVENTOR
Elmer Holman
by John Wagner
Attorney

United States Patent Office 3,080,632
Patented Mar. 12, 1963

3,080,632
ZIPPER SAFETY FASTENER
Elmer Holman, 1005 Hill St., Dallas, Oreg.
Filed July 20, 1961, Ser. No. 125,483
6 Claims. (Cl. 24—205.14)

The present invention relates to a zipper fastener and more particularly to a zipper fastener of the type in which the fastening element is locked in position by a detent element to prevent the opening or closing movement of the fastener.

The present invention has as its prime object a fastener of this type which may be closed or opened readily and smoothly. More specifically the present invention has as one of its objects a zipper fastener in which the locking means is brought out of engagement with the fastening elements during the opening or closing movement of the fastener.

It is another object of this invention to employ merely three main elements in achieving the prime object and to construct these elements in a sturdy, simple and expedient manner.

A further object is to eliminate nipples and pointed detents such as is found in prior detent zipper fasteners.

In order to accomplish the above objects my invention resides in the elements of a zipper fastener and their relationship one to the other, hereinafter more particularly described in the specification and defined in the claims.

The detailed description of my invention is accompanied by drawings in which:

FIG. 1 is a perspective view of a zipper fastener embodying features of the present invention, with the fastener in the unlocked position.

FIG. 2 is a plan view of the zipper fastener shown in FIG. 1 with the elements in the locked position.

FIG. 3 is a partially sectioned side view, the section being taken through the zipper fastener in the plane of the line 3—3 of FIG. 2.

FIG. 4 is a partially sectioned side view similar to FIG. 3 but with the toggle raised to release the catch spring and unlock the fastener.

FIG. 5 is a side view of the catch spring.

In the particular construction shown in the drawings the invention is applied to a one-piece die cast slide. First referring to FIG. 1, the zipper fastener comprises three main elements, a body 1, a toggle 2, and a catch spring 3.

The body is constructed with two upright walls 11 and 12, having each two staggered holes 13, 14 and 13' 14'. In the opening direction of the fastener on the upper side a rectangular aperture 15 is provided. This end of the body is formed of two parallel walls 16 and 17. The aperture 15 is in the wall 16. At the other end of the body these walls are integrally connected by a neck 18 as is conventional in zipper fasteners. A Y shaped channel 19 is provided through the center of the body as is shown in dotted lines in FIG. 2. This channel 19 as shown in FIG. 3 is located between flanges 16', 17' at the outer edges of the two parallel walls 16 and 17. These flanges also form a narrow mouth 20 which receives the material to be connected together. The channel 19 facilitates the closing movement of the zipper fastener since the strips or stringers 4, FIG. 1, are readily admitted into the channel to be coupled together.

The toggle 2 is formed of a curved piece of steel the curved portion being shown at 21 in FIG. 2. A hole 22 is bored in one end of the toggle to provide an aperture for receiving a riveted pin 5. The other end of the toggle has a rounded portion 23 to provide a recess in which the toggle may be raised from the locked position by inserting a finger nail behind the rounded portion 23 and applying a force in the direction of arrow X. The toggle is formed in two portions 24, 25 connected by a neck 26. A large cavity 27 is provided at the pivot end of the toggle which allows the toggle to pivot over the raised portions 11 and 12 of body 1. A narrow cavity 28 is provided at the neck end of the toggle to allow the toggle to pivot over the catch spring 3 and engage it with its end wall 28' to forcibly retain the catch spring in position. The neck portion 26 has a beveled portion defining one edge of cavity 28. This beveled portion serves to facilitate the operation of forcing toggle 2 over the catch spring 3.

Catch spring 3 has a goose neck shape as is clearly seen in FIG. 5. A bore 31 is formed in one end of the catch string for receiving a riveted pin 6 about which the catch spring is adapted to pivot. A hook 32 is provided at the other end of the catch spring. At the base of the hook a flat retaining base portion is provided which is adapted to forcibly retain the zipper fastener in position when it is pressed against the stringers coupled together in the channel portion of the zipper fastener. The two end portions of the catch spring are connected by a curved neck portion 34. The catch spring is connected to the lock body by the riveted pin 6 passing through bores 14, 31 and 14' so that the catch spring may pivot on the body member. The toggle is likewise connected to the body by riveted pin 5 passing through bores 22, 13 and 13'. Accordingly, the toggle 2 and the hook 32 have each a different pivoting axis, the axis of the toggle being located below and rearwardly relative to the axis of the hook member. This arrangement provides a better locking effect of the toggle 2 against the hook 32 in the locking position.

To lock the zipper fastener the catch spring 3 is pivoted into cavity 15 with its flat base portion resting in channel 21 as shown in FIG. 3. The web portion between the flat base 33 of the catch spring 3 and its hook portion 32 is formed into an angular shape of somewhat less than a right angle which terminates in a sharp edge 35. This edge is adapted to engage the stringer in the locking position of the hook and toggle assembly so as to prevent any slippage of the stringers through the fastener. The hook portion 32 has an indentation or step 36 intermediate the sharp edge 35 and the curved end of the hook portion. In this position the flat base rests on the stringers. The toggle 2 is rotated about riveted pin 5 and over the hook 32 of catch spring 3. This will cause the neck 34 to yield slightly particularly in its reduced portion 34' and will force the flat base 33 of the catch spring down against the fastening elements. The zipper fastener will then be locked in the position shown in FIG. 3. To unlock the fastener the toggle 23 is raised over the hook portion 32 of catch spring 3. The zipper fastener can be actuated in the opening or closing direction when in the unlocked position. The fastening elements may be coupled by pulling on toggle 2 in the direction y or uncoupled by pulling on catch spring 3 in the direction z.

The construction and operation, as well as the many advantages of my improved zipper fastener will be apparent from the foregoing detailed description. It is also apparent that while I have described my invention in a preferred form, many changes and modifications may be made in the structure disclosed without departing from the spirit of the invention as sought to be defined in the following claims.

I claim:

1. A zipper fastener for interlocking the stringers and for coupling the fastener thereto, comprising spaced top and bottom walls defining a channel adapted to receive said stringers for sliding movement therein, a pair of upright parallel walls secured to said top wall, a catch and a toggle mounted pivotally on said upright walls, said top wall having a longitudinally extending slot for receiving said catch, the pivotal axis of the catch being disposed between the slot and the pivotal axis of the toggle, said catch being pivotable into said slot to engage said stringers in the locking position, said toggle being pivotable against said catch to urge it against said stringers and maintain it in the locking position.

2. A zipper fastener for interlocking the stringers and for coupling the fastener thereto comprising a top wall and a bottom wall disposed in spaced relation to each other and adapted to receive said stringers therebetween, an integral neck portion at one end for connecting said top and bottom walls, a pair of spaced upright parallel walls secured to said top wall, a pair of spaced pivot means secured to said parallel walls, a catch spring and a toggle mounted pivotally on said pivot means, said top wall having a longitudinally extending slot for receiving said catch spring, said catch spring being pivotable into said slot to engage said stringers in the locking position, said toggle being pivotable against said catch spring to urge it against said stringers and maintain it in the locking position.

3. A zipper fastener for interlocking the stringers and for coupling the fastener thereto, comprising a top wall and a bottom wall disposed in spaced relation to each other and adapted to receive said stringers therebetween, a pair of spaced upright parallel walls secured to said top wall, a catch spring and a toggle mounted pivotally on said upright walls, said top wall having a rectangular aperture, upright parallel walls secured to said top wall adjacent one end thereof, a catch spring pivotally connected adjacent one end to said upright walls, a toggle pivotally connected adjacent the other end to said upright walls and having a slot adapted to permit a pivoting of said toggle over said catch spring, said catch spring having a resilient hook portion and a flat base, said top wall having a longitudinally extending slot for receiving said catch spring, said catch spring being pivotable into said slot to engage said stringers in the locking position, said toggle being pivotable against said catch spring to urge it against said stringers and maintain it in the locking position.

4. A zipper fastener for interlocking the stringers and for coupling the fastener thereto, comprising a pair of superjacent horizontally extending base walls interconnected in spaced relationship at one end, said superjacent walls defining a Y-shaped channel adapted to receive and interlock said stringers, the top wall of said superjacent walls being provided with an aperture therein, a pair of upright parallel walls mounted on said top wall, said upright walls having staggered bores therein for receiving each a pivot pin, a toggle pivotally secured to one of said pins, a catch spring pivotally secured to the other of said pins, said catch spring having a resilient hook portion and a flat base, said flat base being shaped to pass through the aperture in said top wall and adapted to engage said stringers in the locking position, said flat base terminating in a sharp forward edge, said toggle having a central slotted portion for pivoting the toggle over said catch spring to engage said resilient hook portion and force said sharp forward edge against said stringers to lock said catch spring in position.

5. A zipper fastener for interlocking the stringers and for coupling the fastener thereto, comprising a top wall and a bottom wall disposed in spaced relation to each other and adapted to receive said stringers therebetween, a pair of upright parallel walls secured to said top wall, said top wall having a rectangular opening forwardly of said upright walls, a catch spring and a toggle mounted pivotally in spaced relationship on said upright walls, said catch spring having a resilient hook portion and a flat base, a web portion intermediate said resilient hook portion and said flat base terminating in a sharp edge, said flat base being adapted to pass through said rectangular opening, said toggle having a slot adapted for pivoting said toggle over said catch spring to engage said resilient hook portion with an end wall of said slot in the locking position to force said sharp edge against the stringers and secure said zipper fastener in position on said stringers.

6. A zipper fastener for interlocking the stringers and for coupling the fastener thereto comprising a top wall and a bottom wall, a neck portion for securely joining said top wall to said bottom wall at one end, upright parallel walls secured to said top wall adjacent said one end, said top wall having a rectangular aperture forwardly of said upright walls, a catch spring pivotally connected adjacent one end to said upright walls, a toggle pivotally connected at the other end to said upright walls, said toggle having a slot adapted to permit a pivoting of said toggle over said catch spring, said catch spring having a resilient hook portion and a flat base, said resilient hook portion having a stepped end portion, said catch spring being rotatable into said rectangular aperture in said top wall to engage said stringers, said toggle being rotatable over said catch spring to force the catch spring against said stringers and retain it in the locked position.

References Cited in the file of this patent
UNITED STATES PATENTS
2,068,503    Marinsky  --------------- Jan. 19, 1937